(No Model.)

L. E. HOWLAND.
MEASURING INSTRUMENT.

No. 592,911.　　　　　　　　　Patented Nov. 2, 1897.

Witnesses
F. B. Berry.
L. M. Graves.

Inventor
Lewis E. Howland
by John Wedderburn
Attorney

UNITED STATES PATENT OFFICE.

LEWIS E. HOWLAND, OF CHICAGO, ILLINOIS.

MEASURING INSTRUMENT.

SPECIFICATION forming part of Letters Patent No. 592,911, dated November 2, 1897.

Application filed July 15, 1896. Serial No. 599,215. (No model.)

*To all whom it may concern:*

Be it known that I, LEWIS E. HOWLAND, a citizen of the United States, residing at Chicago, in the county of Cook and State of Illinois, have invented certain new and useful Improvements in Measuring Instruments; and I do hereby declare the following to be a full, clear, and exact description of the invention, such as will enable others skilled in the art to which it appertains to make and use the same.

My invention relates to measuring instruments.

The object of the same is to provide a simple and effective device for measuring land, the same being especially designed for use by farmers.

The usual method of measuring land adopted by farmers is to pace it off or to use a tape-measure. The former plan is objectionable in that it is not accurate, and the latter is objectionable because it requires two men to perform the operation and, furthermore, takes considerable space of time.

My invention is designed to overcome these objections; and it consists of a frame made up of a pair of uprights, constituting legs, and a pair of beams extending outwardly therefrom formed with handles upon their rear ends and with recesses at their forward ends, with inwardly-extending V-shaped teeth or projections leading from the upper and lower sides of said recesses, a measuring-wheel mounted upon a suitable shaft which is adapted to fit within the said recesses, a lug upon the hub of said wheel, a spring secured to the upper surface of one of said beams whose free end is adapted to engage said lug, removable blocks having V-shaped notches in their upper and lower ends adapted to fit within said recesses, and pins for holding said blocks in place, the forward ends of said beams and the rear ends of said blocks both being cut away, forming bearings for the shaft upon which said measuring-wheel is mounted.

The invention also consists in other details of construction and combinations of parts which will be hereinafter more fully described and claimed.

Figure 1:
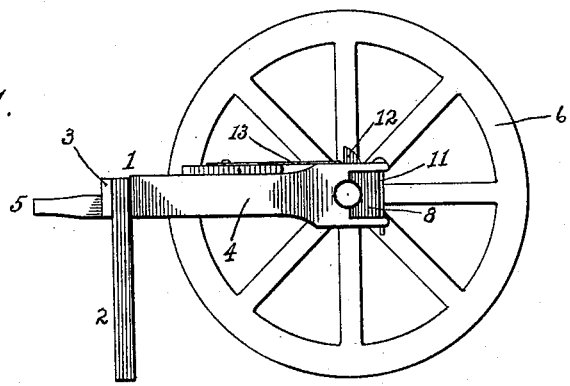
Figure 2:
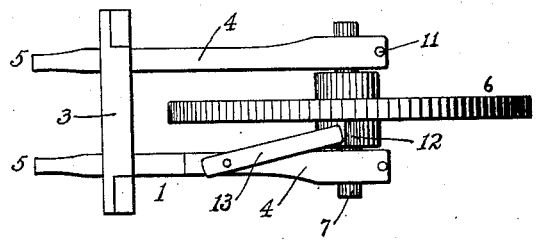
Figure 3:
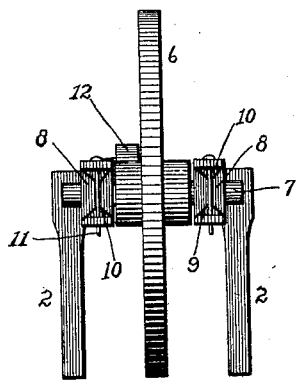
Figure 4:
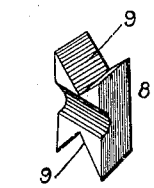

In the drawings forming part of the specification, Figure 1 represents a side elevation of my device. Fig. 2 is a top plan view of the same. Fig. 3 is a front elevation, and Fig. 4 is a detail perspective view of one of the removable blocks constituting part of the wheel-bearings.

Like reference-numerals indicate like parts in the different views.

My improved device is made up of a frame 1, consisting of a pair of legs or uprights 2 2, having a cross-bar 3 at their upper ends, and forwardly-extending beams 4 4, having handles 5 5 thereon, as clearly shown. Mounted in suitable bearings in the forward ends of the beams 4 4 is a measuring-wheel 6, whose periphery measures some unit of length, as a yard or a rod. The shaft 7 of said wheel fits in the bifurcated outer ends of the beams 4 4 and is held in place therein by means of removable blocks 8 8, having V-shaped notches or recesses 9 9 cut in their opposite edges. Within these recesses are similarly-shaped teeth 10 10 on the inner edges of the beams 4 4. The said blocks are held in place by means of pins or rods 11, passing through the extreme outer ends of said beams 4. The hub of the wheel 6 has a lug or projection 12 thereon, which is engaged by a flat spring 13, secured to the top surface of one of the beams 4, for the purpose of indicating audibly the number of revolutions made by said wheel, a click being produced each time said spring passes over said lug. The outer edge of the wheel 6 may have a metal tire secured thereon, and said wheel may also be graduated for the purpose of indicating proportional parts of the unit of length which the periphery of said wheel measures.

In using my device the position of the wheel is first taken, and then the frame is moved forwardly by grasping the handles 5 and rotating the wheel 6. At each revolution thereof an audible indication will be given by the click produced by the springs 13 passing over the lug 12. Any distance may thus be readily, conveniently, and accurately measured.

In manufacturing my improved device I propose to provide with each instrument two or more separate measuring-wheels of different sizes—one, for example, for measuring a rod and another for measuring a yard. The wheels are interchangeable on the frame 1 by removing the blocks 8, taking out the wheel which was originally mounted in the beams 4, and inserting the other wheel, afterward reapplying said blocks in the manner described.

Having now described my invention, what I claim as new, and desire to secure by Letters Patent, is—

The herein-described land-measuring instrument, consisting of a frame made up of a pair of uprights constituting legs, and a pair of beams extending outwardly therefrom formed with handles upon their rear ends and with recesses at their forward ends, with inwardly-extending V-shaped teeth or projections leading from the upper and lower sides of said recesses, a measuring-wheel mounted upon a suitable shaft which is adapted to fit within the said recesses, a lug upon the hub of said wheel, a spring secured to the upper surface of one of said beams whose free end is adapted to engage said lug, removable blocks having V-shaped notches in their upper and lower ends adapted to fit within said recesses, and pins for holding said blocks in place, the forward ends of said beams and the rear ends of said blocks both being cut away forming bearings for the shaft upon which said measuring-wheel is mounted, substantially as and for the purpose described.

In testimony whereof I have signed this specification in the presence of two subscribing witnesses.

LEWIS E. HOWLAND.

Witnesses:
 H. H. MATHER,
 W. NORMAN MURRAY.